United States Patent
Kumazaki et al.

(10) Patent No.: US 7,612,649 B2
(45) Date of Patent: Nov. 3, 2009

(54) SMART ENTRY SYSTEM

(75) Inventors: Takeshi Kumazaki, Okazaki (JP);
Hiroshi Yagyu, Tsushima (JP)

(73) Assignee: Denso Corporation, Kariya (JP)

( * ) Notice: Subject to any disclaimer, the term of this patent is extended or adjusted under 35 U.S.C. 154(b) by 836 days.

(21) Appl. No.: 11/125,175

(22) Filed: May 10, 2005

(65) Prior Publication Data

US 2005/0253684 A1    Nov. 17, 2005

(30) Foreign Application Priority Data

May 12, 2004 (JP) .............................. 2004-142752

(51) Int. Cl.
*G06F 7/04* (2006.01)
(52) U.S. Cl. .................... 340/5.62; 340/5.61; 340/5.63; 340/5.72
(58) Field of Classification Search ................ 340/5.61, 340/5.62, 5.63, 5.72; 307/10.1
See application file for complete search history.

(56) References Cited

U.S. PATENT DOCUMENTS

| | | | | |
|---|---|---|---|---|
| 3,657,553 A | * | 4/1972 | Ballou ....................... | 307/10.1 |
| 4,942,393 A | * | 7/1990 | Waraksa et al. ............. | 340/5.62 |
| 5,252,966 A | * | 10/1993 | Lambropoulos et al. .... | 340/5.64 |
| 5,278,547 A | * | 1/1994 | Suman et al. ............... | 340/5.22 |
| 5,744,875 A | * | 4/1998 | Kleefeldt et al. ........... | 307/10.2 |
| 5,850,174 A | * | 12/1998 | DiCroce et al. ........ | 340/426.28 |
| 6,396,389 B1 | * | 5/2002 | Nakano et al. ............. | 340/5.72 |
| 6,552,649 B1 | * | 4/2003 | Okada et al. ............... | 340/5.61 |
| 2001/0028296 A1 | * | 10/2001 | Masudaya ................... | 340/5.61 |
| 2002/0017978 A1 | * | 2/2002 | Kanda et al. ............... | 340/5.61 |
| 2003/0222756 A1 | * | 12/2003 | Shimonomoto et al. .... | 340/5.61 |

* cited by examiner

*Primary Examiner*—Edwin C Holloway, III
(74) *Attorney, Agent, or Firm*—Posz Law Group, PLC (57) ABSTRACT

A smart entry system for a vehicle includes a transmitter on a vehicle and a portable unit carried by a user. The transmitter transmits a request signal which defines a user detection area to detect whether the portable unit transmits a response signal to indicate the user. When the user enters the detection area while all the doors are locked, an unlock standby state is set. When the user touches a touch sensor of a driver-seat side door under the unlock standby state, only the driver-seat side door is first unlocked. The other doors are kept locked if the user opens the D-door by the time when T2 seconds elapse. On the other hand, all the doors are unlocked when T2 elapses while the driver-seat side door is not opened.

5 Claims, 5 Drawing Sheets

SMART ENTRY SYSTEM

CROSS REFERENCE TO RELATED APPLICATION

This application is related to and incorporates herein by reference Japanese Patent Application No. 2004-142752 filed on May 12, 2004.

FIELD OF THE INVENTION

The present invention relates to control for locking of and unlocking of doors of a vehicle, and particularly to a smart entry system for carrying out locking/unlocking control of doors of a vehicle without inserting a key into a key cylinder of a vehicle nor operating a switch provided in the key.

BACKGROUND OF THE INVENTION

In a conventional keyless entry system, each actuator of a door lock mechanism of a vehicle is operated by a wireless remote control unit so that the doors of the vehicle can be locked/unlocked at a place remote from the vehicle. According to this keyless entry system, it is general that plural switches are provided on a transmitter for wireless operation at Such a manner that each operating switch has its own function. For example, all the doors are unlocked by switch operation on a door unlock switch.

However, if all the doors are unlocked by switch operation on the door unlock switch, a stranger (unauthorized person) may get into the vehicle from the assistant driver's seat side when an authorized user gets into the driver's seat after the doors are unlocked. Therefore, it is proposed that only the door at the driver's seat side is unlocked by the first switch operation and then all other doors are unlocked by the subsequent switch operation.

Furthermore, in another entry system, that is, a smart entry system, a user carrying a portable unit (containing a wireless device) can open the doors of a vehicle by merely touching a door handle of the vehicle under the state that he/she approaches vehicle. This system is already practically used in vehicles, etc. According to the smart entry system, when a user having a portable unit which can make mutual communications with a transmitter provided in each door or the like of the vehicle approaches the vehicle and enters a predetermined area, so that predetermined communications are made between the transmitter and the portable unit, the doors of the vehicle are set to an unlock standby state. Then, when the user touches the door handle provided with the transmitter under the unlock standby state, the door concerned or all the doors are unlocked. The doors can be locked by switch operation of a separately provided door lock switch.

In the smart entry system, the twice-operation unlock specification is required for the purpose of enhancing the security performance as in the case of the keyless entry system. A system in which a lock switch is also used in an unlock operation is known as a smart entry system to which the twice-operation unlock specification is applied (for example, Owners Guide—Infiniti FX45/FX35 2004), Third Chapter (pp 3-13), Specifically, when a door lock switch is operated once first under the unlock standby state, only the door at the driver's seat side is unlocked. All other doors are unlocked by switch operation on the lock switch again within a fixed period (for at Stance, 5 seconds). When the switch is operated again, all the doors are locked again. Furthermore, when the switch is operated once and the fixed period elapses under the state of unlocking of the door at the driver's seat side, the door is locked again.

In the above twice-operation unlock control, only the driver's seat door is first unlocked, and then all the doors are subsequently unlocked. However, when it is required to unlock the door at the driver's seat side by switch operation of the lock switch once and then immediately lock the door, the door concerned is locked after all the doors are temporarily unlocked. That is, even when it is unnecessary to unlock all the doors for the user (the user does not want to unlock all the doors), it is necessary to temporarily unlock all the doors in order to lock his/her desired door. Thus, an operation contrary to the user's intention is necessarily carried out.

Therefore, for example, in a case where a user finds a stranger at the assistant driver's seat side when he/she is about to unlock the driver's seat door and get into the vehicle (open the door), the user twice operates the lock switch to immediately lock the driver's seat door again. However, at this time, all the doors are temporarily unlocked. Thus, the stranger may get into the vehicle from the assistant driver's seat side.

Therefore, if the twice-operation unlock specification is not applied to the unlock operation based on the switch lock operation, but applied to the existing smart entry system in which a door is unlocked by touching the door handle of the door, the user could immediately lock the driver's seat door by switch operation of the lock switch when he/she wants to immediately lock the driver's seat door under the state that only the driver's seat door is unlocked.

Various kinds of touch sensors such as an electrostatic capacitance type touch sensor, an optical type touch sensor, etc. are normally used for detecting a user touch to the door handle. It is thus very difficult for these touch sensors to clearly discriminate the first touch and the subsequent touch from each other.

Therefore, if the twice-operation unlock specification is directly applied to the existing smart entry system, it is likely that the touch sensor side determines that the door handle is touched twice (or more) although the user believes that he/she touched the door handle only once, and thus all the doors are unlocked against a user's intension. If so, even if the user finds a stranger when unlocking only the driver's seat door and thus hastens to lock the door again by the lock switch, the state before the locking may actually be an all-doors unlocked state. In this at Stance, the stranger may get into the vehicle without difficulty.

SUMMARY OF THE INVENTION

The present invention therefore has an object to enable locking/unlocking operations to be surely carried out in accordance with a user's intention in a smart entry system in which a door is unlocked by detecting a touch to a door handle of the door.

According to a first aspect of the present invention, in a smart entry system, a transmitter is provided in connection with a door of a vehicle, and transmits a request signal within a predetermined range surrounding the door concerned. A receiver receives a response signal transmitted from a portable unit in response to the request signal. The transmitter may be provided in each of all the doors of the vehicle or to only a specific door (for example, the driver's seat door or both the driver's seat door and the assistant driver's seat door).

A touch detecting unit is provided in connection with the transmitter (that is, in connection with the door corresponding to the transmitter). It detects a person touch. Furthermore, a locking switch is also provided in connection with the transmitter. When the corresponding door is unlocked, it makes the door to be locked by an external operation.

Various types/constructions such as an electrostatic capacitance type touch sensor, an optical type touch sensor, etc. can be used at Sofar as these can detect touching by a person. The detectable touch may be limited to a direct person touch. Alternatively, it may contain an indirect touch through clothes, belongings or the like.

When the receiver receives the response signal from the portable unit, a control unit sets the door corresponding to the response signal to an unlock standby state. Accordingly, if the touch of a person is detected by the touch detecting unit corresponding to the door after that (after the door is set to the unlock standby state), the door concerned is unlocked. When the door corresponding to the lock switch is set to the unlock state and the lock switch concerned is operated, the door is locked. That is, when a person having a portable unit touches the touch detecting unit within the predetermined range, the corresponding door is unlocked. Then, by operating the lock switch corresponding to the door thus unlocked, the door concerned can be locked again.

Particularly, when the control unit sets a door to the unlock standby state and then the touch of a person is first detected by the touch detecting unit corresponding to the door (specific door), the control unit unlocks only the door concerned. After a predetermined time elapses from the unlocking time, the control unit unlocks at least one of the other doors.

In the smart entry system thus constructed, the unlocking of the first specific door and the unlocking of the other doors are distinguished from each other with a predetermined time lag. Therefore, when a user first touches a door, the first user's touch can be prevented from unlocking of the other doors against the user's intension. In addition, when the user unlocks the first specific door and then he/she wants to lock the specific door concerned again, he/she can lock the specific unlocked door by operating the lock switch without unlocking of the other doors.

Therefore, the unlocking of the specific door and the unlocking plural doors containing the specific door can be distinguished from each other. Thus, a smart entry system can be provided using a touch detecting unit which can surely perform the unlocking/locking operations in accordance with a user's intention.

The unlocking operation after the predetermined time elapses from the unlocking time of the specific door may be carried out by unlocking of all the doors. Or, only the specific door or any other doors (one or plural) may be unlocked. The doors to be unlocked may be properly set so far as the specific door and at least one of the other doors are set to the unlocked state.

When a door under the unlock standby state is opened by the time when the predetermined time elapses after the control unit unlocks the door concerned, it is preferable that the other doors than the door concerned are not unlocked even after the predetermined time elapses.

In the above smart entry system, when the user does not want to unlock the other doors than a specific door, the specific door may be opened within a predetermined time. On the other hand, when the user wants to unlock the other doors as well as the specific door, the user may not open the specific door even after the specific door is unlocked, and then waits until a predetermined time elapses.

Therefore, the unlocking only the specific door and the unlocking of the plural doors containing the other doors are distinguished from each other. In addition, the other doors can be surely prevented from being unlocked by opening the specific door by the time when the predetermined time elapses. Therefore, the unlocking/locking operations which more accurately reflect the user's intention can be surely performed.

Next, it is preferable that when the control unit unlocks a door under the unlock standby state, the predetermined time elapses and then the person touch is detected by the touch detecting unit corresponding to the door, the control unit unlocks at least one of the other doors.

That is, there is implemented the twice-operation unlock in which when the touch detecting unit is first touched, only the specific door corresponding to the touch detecting unit is unlocked, and when the touch detecting unit is touched again, the other doors are unlocked. However, unlike the conventional twice-operation unlock, a time lag is provided between the first touch and the subsequent touch, and the second touch is validated after a predetermined time elapses from the first touch.

Therefore, there is no erroneous detection that twice touch is detected although the user believes only one touch. Thus there can be provided a smart entry system based on the twice-operation unlock specification in which the unlocking only a specific lock and the unlocking plural doors containing other doors can be distinguished from each other.

According to another aspect of the present invention, in a smart entry system, when the control unit sets a door to the unlock standby state and then a person touch is first detected by the touch detecting unit corresponding to the door, the control unit unlocks only the door. When the door is opened after being unlocked, the control unit unlocks at least one of the other doors than the door concerned.

According to this construction, when the touch detecting unit is first touched, only the specific door corresponding to the touch detecting unit is unlocked. Thereafter, the other doors are unlocked by opening the specific door. Therefore, the unlocking of the specific door and the unlocking plural doors containing the specific door can be distinguished from each other. Further, there can be provided a smart entry system using a touch detecting unit which can surely perform the unlocking/locking operations in accordance with the user's intention.

In this case, even when it is unnecessary, not preferable, to unlock the other doors than the specific door, the other doors are unlocked when the specific door is unlocked and then opened. Therefore, the control unit can prevent the unlocking of the other doors.

That is, it is preferable that only when a door under the unlock standby state is opened by the time when a predetermined time elapses after the control unit unlocks the door concerned, the control unit unlocks at least one of the other doors.

According to the above construction, if the specific door which is unlocked by the first touch to the touch detecting unit is opened after a predetermined time elapses from the unlocking of the door concerned, the other doors are kept locked. Thus, the unlocking/locking operations which accurately reflect the user's intention can be surely performed.

According to a third aspect of the present invention, in a smart entry system, when the control unit sets a door to the unlock standby state and then a person touch is first detected by the touch detecting unit corresponding to the door concerned, any one of unlocking of only the door or unlocking of the door and at least one of the other doors than the door concerned is executed in accordance with whether a lock switch is operated or not.

That is, the unlocking only the specific door and the unlocking plural doors containing the specific door can be rapidly performed. As a specific method, only the specific door corresponding to the touch detecting unit is unlocked when the person merely touches the touch detecting unit. Further the plural doors containing the specific door are unlocked, when the person touches the touch detecting unit while operating the lock switch.

Conversely, it may be modified so that only the specific door corresponding to the touch detecting unit is unlocked when the person touches the touch detecting unit while operating the lock switch, and the plural doors containing the specific door are unlocked when the person merely touches the touch detecting unit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Preferred embodiments according to the present invention will be described hereunder with reference to the accompanying drawings.

First Embodiment

Figure 1:
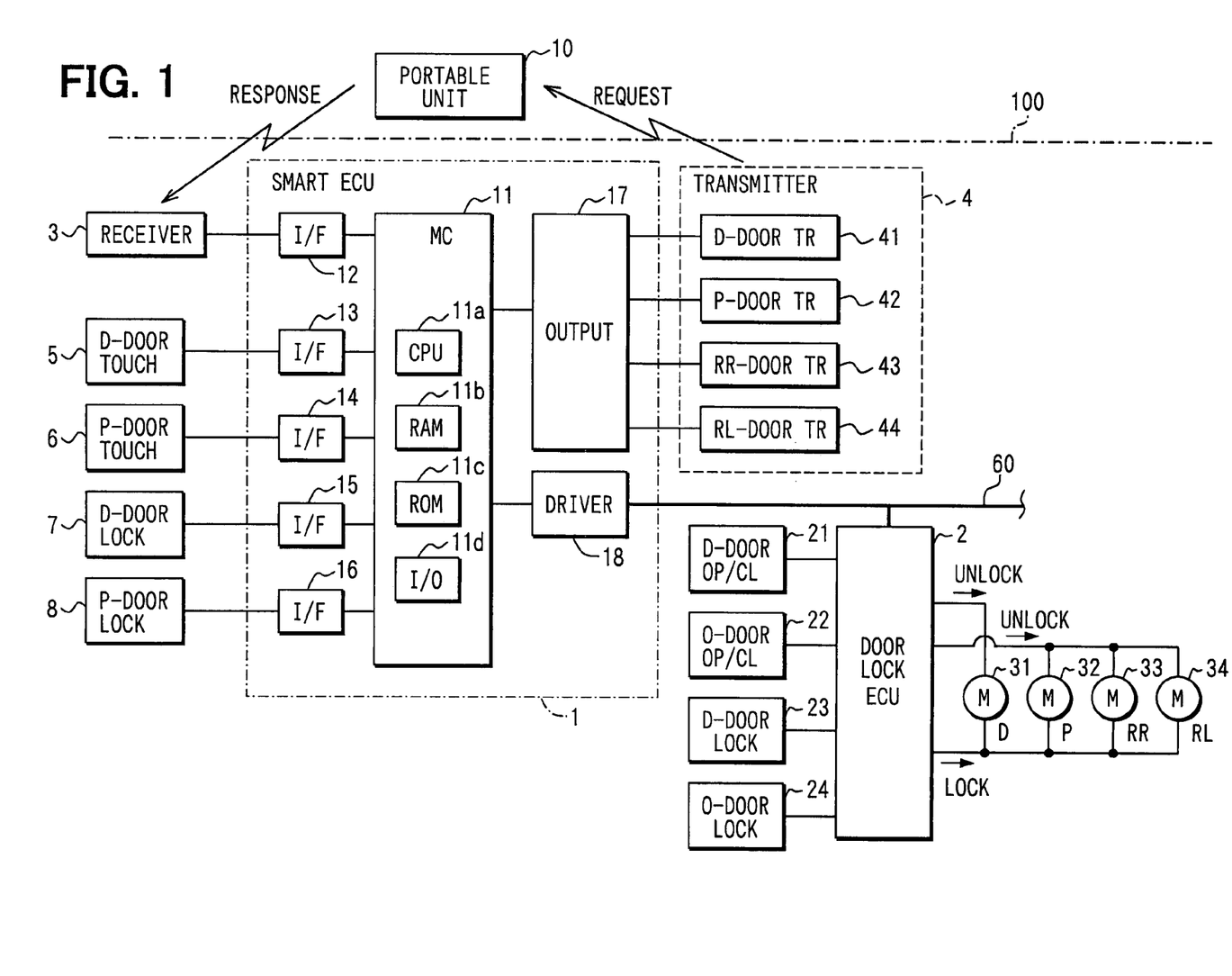
FIG. 1 is a block diagram showing a smart entry system according to the present invention.

Referring to FIG. 1, a smart entry system mainly includes a portable unit 10 carried by a user such as a driver or the like, a smart ECU 1, a door lock ECU 2, a receiver 3 and a transmitter 4, which are mounted on a vehicle 100. The system also includes a portable unit 10 carried by a user such as a driver or the like. The receiver 3 is mounted at Side a vehicle compartment to receive electric waves from the portable unit 10. The transmitter 4 is mounted outside the vehicle compartment for transmitting a request signal from the vehicle 100 to the portable unit 10.

The smart ECU 1 is connected to a D-door touch sensor 5 which is contained in a door handle of the door at the driver's seat (D-seat) to detect a person touch when a user touches the door handle and output a detection signal to a smart ECU 1, a P-door touch sensor 6 which is contained in a door handle of the door at the assistant driver's (passenger') seat (P-seat) to detect a person touch when the user touches the door handle and output a detection signal to the smart ECU 1, a D-door lock switch 7 which is contained in the door handle of the D-door to lock the D-door and outputs to the smart ECU 1 a switch signal indicating switch operation of the D-door lock switch 7 by the user when the user operates the D-door lock switch 7, and a P-door lock switch 8 which is provided in the door handle of the P-door to lock the P-door and outputs to the smart ECU 1 a switch signal indicating switch operation of the P-door lock switch 8 by the user when the user operates the P-door lock switch 8.

The smart ECU 1 is for executing various kinds of control as the smart entry system on the basis of the electric waves from the portable unit 10 and the respective signals from the touch sensors 5, 6 and the lock switches 7, 8. The door lock ECU 2 is connected to the smart ECU 1 through an in-vehicle LAN 60 and controls the lock/unlock each door.

Figure 2:
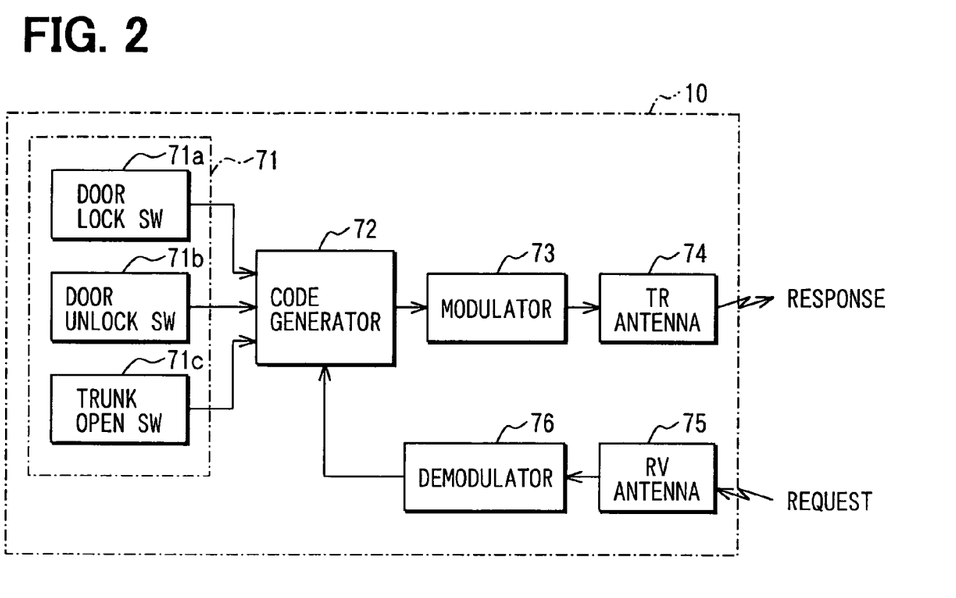
FIG. 2 is a block diagram showing a portable unit.

As shown in FIG. 2, the portable unit 10 is equipped with an operating switch 71, a control code generator 72, a modulator/amplifier unit 73, a transmission antenna 74, a reception antenna 75 and a demodulator 76.

The operating switch 71 has three switches, that is, a door lock switch 71*a* to be operated when each of doors 51 to 54 (FIG. 3) of the vehicle is locked, a door unlock switch 71*b* to be operated when each of the doors 51 to 54 is unlocked, and a trunk open switch 71*c* to be operated when a trunk (not shown) is opened. When any one of the switches 71*a* to 71*c* is operated (pushed), a control code generator 72 outputs to the modulator/amplifier unit 73 a control code which is achieved by adding the function code corresponding to the pushed switch with an ID code inherent to the portable unit 10. The modulator/amplifier unit 73 modulates (FM-modulate, for example) carrier waves (high-frequency signal) from a local oscillator (not shown) on the basis of the control code, and properly amplifies the signal after the modulation. The signal (control code) thus modulated and amplified is transmitted as a response signal from the transmission antenna 74 with electric waves of a predetermined frequency.

When the receiver 3 at the vehicle side receives the electric waves, the operation corresponding to the pushed switch is executed. That is, the smart entry system of this embodiment has also the function as a keyless entry system.

A request signal from each of transmitters 41 to 44 constituting the transmitter 4 is periodically transmitted in accordance with a control at Struction from the smart ECU 1. When the portable unit 10 enters a range (detection area) in which the request signal can be received, the request signal is received by the reception antenna 75 provided in the portable unit 10. The request signal is a signal for requesting for transmission of an ID code to the portable unit 10.

When the request signal is received at the reception antenna 75, the request signal is subjected to data demodulation in the demodulator 76, and the modulated data are input to the control code generator 72. When the demodulated data are input, the control code generator 72 generates a response signal by adding an ID code to data indicating that the request signal is received, and transmits the response signal through the modulator/amplifier unit 73 and the transmission antenna 74 by electric waves.

Figure 3:
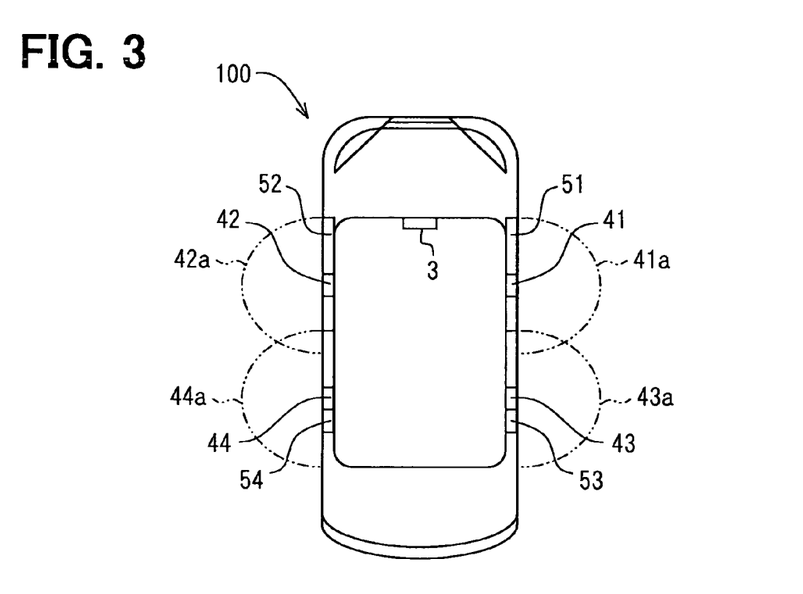
FIG. 3 is a schematic view showing plural detection areas formed around a vehicle.

The transmitter 4 has, as shown in FIG. 3, a D-door transmitter 41 provided around a door handle (not shown) of a D-door 51 (FIG. 3), a P-door transmitter 42 provided around a door handle (not shown) of a P-door 52, an RR-door transmitter 43 provided around a door handle (not shown) of a RR-door 53 which corresponds to the door at the rear seat of the D-seat, and an RL-door transmitter 44 provided around a door handle (not shown) of a RL-door 54 corresponding to the door of the rear seat of the P-seat (RL-seat). The same transmitter (not shown) is also provided in a trunk or in the vehicle.

The detection area where the request signal transmitted from each of the transmitters 41 to 44 can be received by the portable unit 10 is set to be very small. For example, the detection area 41*a* of the D-door transmitter 41 is set to an area which is out of the vehicle and within about 0.7 m in radius around the D-door transmitter 41 as indicated by a broken line in FIG. 3. The same is set to the detection area 42a of the P-door transmitter 42, the detection area 43a of the RR-door transmitter 43 and the detection area 44a of the RL-seat side communication 44.

The receiver 3 is secured around a room mirror (no shown) at the front side of the at Side of the vehicle, and it receives electric waves from the portable unit 10. The same receiver may be disposed in the trunk.

The door lock ECU 2 is connected to the smart ECU 1 through the in-vehicle LAN 60 so that data communications can be mutually performed therebetween, and controls the locking/unlocking of the respective doors 51 to 54 in accordance with the control signal from the smart ECU 1.

Each of the respective doors 51 to 54 is provided with a lock mechanism (not shown) for locking/unlocking of the door. The door lock ECU 2 controls current supply to each of door lock motors 31 to 34 constituting the lock mechanism, thereby carrying out the locking/unlocking of the doors. For example, when only the D-door 51 is desired to be unlocked, the D-door 51 is unlocked by supplying predetermined current to the door lock motor 31 provided in the D-door 51. When the D-door 51 is to be locked, current having the opposite polarity may be applied.

With respect to the other doors 52 to 54 than the D-door 51, the respective door lock motors 32 to 34 are connected in parallel to one another with respect to the door lock ECU 2. Therefore, the current supply to each of the door lock motors 32 to 34 and thus the locking/unlocking of the doors 52 to 54 is carried out simultaneously among these door lock motors 32 to 34 and the doors 52 to 54.

Furthermore, there are further provided a D-door opening/closing switch 21 for detecting the opening/closing state of the D-door 51, an other-door opening/closing switch 22 for detecting the opening/closing state of each of the other doors (O-door) 52 to 54, a D-door lock position switch 23 for detecting whether the D-door 51 is locked or not, and an O-door lock position switch 24 for detecting whether each of the other doors 52 to 53 is locked or not. Each of these switches 21 to 24 is connected to the door lock ECU 2. Accordingly, the detection signal of each of the switches 21 to 24 is input to the door lock ECU 2.

The door lock ECU 2 transmits these detection signals from the respective switches 21 to 24 to the smart ECU 1 as occasion demands. Accordingly, the smart ECU 1 can determine to which one of a door-open state and a door-closed state each of the doors 51 to 54 is set, or to which one of a lock state and an unlock state each of the doors 51 to 54 is set.

The other-door opening/closing switch 22 is actually provided in each of the doors 52 to 54, and the other-seat door lock position switch 24 is actually provided in each of the doors 52 to 54, however, they are illustrated as being simplified and unified as a single body in FIG. 1.

Each of the D-door touch sensor 5 and the P-door touch sensor 6 has an electrostatic capacitance type touch sensor. However, this is an example, and various types such as an optical type, a resistance film type, an ultrasonic type, etc. may be used, and it is not limited to a specific type at Sofar as it can detect at least user's direct touch.

The smart ECU 1 executes various kinds of control as the keyless entry system and the smart entry system. It is equipped with a microcomputer 11, a driver 18, respective interfaces (I/F) 12 to 16 and an output circuit 17.

The microcomputer 11 is constructed as a well-known one-chip microcomputer including CPU 11a, RAM 11b, ROM 11c, I/O 11d, etc. CPU 11a executes not only smart door lock control processing described later, but also various processing according to programs stored in ROM 11c. In ROM 11c are stored not only the respective programs, but also various kinds of information such as control parameters, ID code inherent to the vehicle, etc. which are needed when the various kinds of processing are carried out by CPU 11a. These control parameters, the ID code, etc. may be separately stored in an electrically rewritable non-volatile memory such as EEPROM or the like separately from ROM 11c.

The detection signal from the D-door touch sensor 5 is input through I/F 13 to the microcomputer 11, the detection signal from the P-door touch sensor 6 is input through I/F 14 to the microcomputer 11, the detection signal from the D-door lock switch 7 is input through I/F 15 to the microcomputer 11, the detection signal from the P-door lock switch 8 is input through I/F 16 to the microcomputer 11, and the control code and the response signal received by the receiver 3 are input through I/F 12 to the microcomputer 11. Furthermore, the driver 18 functions as an interface for converting a signal transmitted on the in-vehicle LAN 60 to a signal which can be processed in the microcomputer 11.

When all the doors 51 to 54 of the vehicle 100 are in the closed state, each of the transmitters 41 to 44 provided in the respective doors 51 to 54 intermittently transmits a request signal. When the user carrying the portable unit 10 approaches the vehicle 100 and enters any one of the detection areas 41a to 44a and also the portable unit 10 receives the request signal from the transmitter which forms the detection area concerned, a response signal is transmitted from the portable unit 10. The receiver 3 provided in the vehicle side receives the response signal, and also compares (collates) the ID code contained in the response signal with the ID code stored in the memory (ROM 11c or the like) at the vehicle side in advance. If it is determined that both the codes are coincident with each other, the door corresponding to the emitting origin (any one of the transmitters 41 to 44) of the request signal received by the portable unit 10 is set to an unlock standby state (that is, a state where the door would be unlocked if a user touches the door handle).

Particularly, when the user enters the detection area 41a of the D-door transmitter 41 and thus the door is set to the unlock standby state, the following operation is carried out.

That is, when the user first touches the D-door touch sensor 5 under the unlock standby state, only the D-door 51 is first unlocked. If the D-door 51 is opened by the time when a predetermined time (T2 seconds) elapses after the D-door 51 is unlocked, the other doors 52 to 54 are kept locked.

On the other hand, when the D-door 51 is not opened by the time when the predetermined time (T2 seconds) elapses after the D-door 51 is unlocked, all the doors 51 to 54 are unlocked after T2 elapses. When no door is opened by the time when a predetermined time (T3 seconds) further elapses after all the doors 51 to 54 are unlocked, all the doors 51 to 54 are locked again when T3 elapses.

Figure 4:
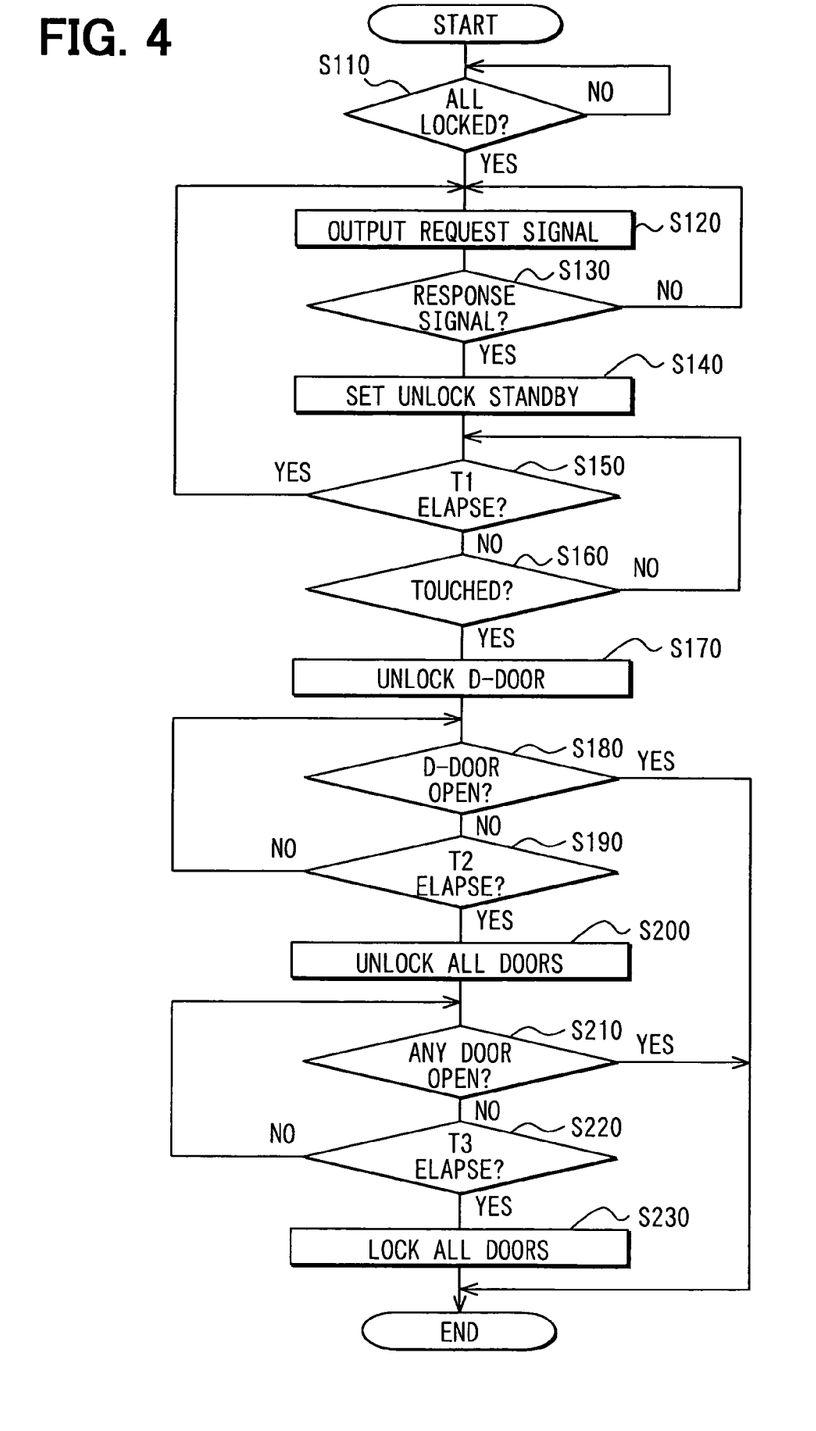
FIG. 4 is a flowchart showing smart door lock control processing of a first embodiment of the present invention.

Next, the smart door lock control processing among various kinds of control processing as the smart entry system carried out in the smart ECU 1, which is started to be executed when all the doors 51 to 54 is are closed, will be described with reference to FIG. 4. The smart door lock control processing shown in FIG. 4 is a part of the processing carried out when the user enters the detection area 41a of the D-door transmitter 41 and thus the D-door is set to the unlock standby state in the control processing for all the doors 51 to 54. In the microcomputer 11 of the smart ECU 11, CPU 11a reads out the smart door lock control processing program from ROM 11c, and executes the processing according to this program.

When all the doors 51 to 54 of the vehicle are closed and thus this processing is started, it is determined at step (S) 110 whether all the doors 51 to 54 are kept locked or not. This determination is carried out by inquiring about the detection state of each door lock switch 23, 24 to the door lock ECU 2. The processing of S110 is repeated when any door is unlocked. When all the doors 51 to 54 are locked, the processing proceeds to S120 to search the portable unit 10. Specifically, the processing of S120 is carried out by outputting a request signal from the D-door transmitter 41 to form the detection area 41a.

At Subsequent S130, it is determined whether the portable unit 10 exists around the vehicle, specifically whether the portable unit 10 enters the detection area 41a. This determination is carried out on the basis of whether a response signal from the portable unit 10 to the request signal is received by the receiver 3. Actually, the other transmitters 42 to 44 also form the respective detection areas 42a to 44a with outputting the respective request signals to form the detection areas 42a to 44a, and determine whether the portable unit 10 enters the detection areas.

The processing of S120 and S130 is repeated while the portable unit 10 is not in the detection area. When the portable unit 10 enters the detection area 41a corresponding to the D-door transmitter 41, the response signal is output from the portable unit 10. When the response signal is received by the receiver 3, the processing proceeds to S140 to set the unlock standby state. That is, if the D-door touch sensor 5 is touched, the D-door 51 is driven into the unlock state.

It is determined at S150 whether a predetermined time (T1 seconds) elapses from the setting to the unlock standby state (S140). It is determined whether touch is detected by the D-door touch sensor 5 at S160 until the predetermined time elapses. The processing of S150 and S160 is repeated while the T1 seconds does not elapse and also the touch is not detected by the D-door touch sensor 5. The processing returns to S120 again when the T1 elapses under the state that no touch detection is continued. When the user or the like touches the D-door touch sensor 5 by the time when T1 elapses, the processing proceeds to S170 to unlock the D-door 51. At this time, the other doors 52 to 54 are still kept locked.

Thereafter, it is determined at S180 whether the D-door 51 is opened or not. If the D-door 51 is opened, the smart door lock control processing is finished. However, if the D-door is not opened, the processing proceeds to S190 to determine whether T2 elapses from the unlocking of the D-door 51 (S170). The determination as to whether the D-door 51 is opened or not is carried out by inquiring about the detection state of each of the door opening/closing switches 21, 22 to the door lock ECU 2.

When T2 elapses under the state that the D-door 51 is kept closed, the processing proceeds to S200 to unlock all the doors 51 to 54. That is, all the other three doors 52 to 54 are unlocked in addition to the D-door 51 which has been already unlocked.

When any door is opened by the time when T3 elapses after all the doors 51 to 54 are unlocked, the smart door lock control processing is finished. However, if all the doors 51 to 54 are still closed even after T3 elapses, the processing proceeds to S230 to lock all the doors 51 to 54 again.

According to the above smart entry system, when the D-door touch sensor 5 is first touched after the unlock standby state is set, only the D-door 51 is unlocked. Thereafter, all the doors are unlocked by waiting for T2 seconds. Therefore, the other doors than the D-door 51 can be prevented from being unlocked against the user's intention. In addition, when the user unlocks the D-door 51 and then wants to lock the D-door 51 again, only the D-door 51 can be locked again without unlocking of the other doors by operating (switch operation) the D-door lock switch 7. Furthermore, if the user opens the D-door 51 by the time when T2 elapses after the D-door 51 is unlocked, the other doors 52 to 54 can be still kept locked.

Therefore, in the smart entry system using the touch sensor (each touch sensor 5, 6), the unlocking of the D-door 51 and the unlocking of all the doors 51 to 54 containing the D-door 51 can be distinguished from each other, so that the locking/unlocking operations based on the user's intention can be surely performed.

Second Embodiment

The second embodiment is similar to the first embodiment. It is however different in the following points.
(1) When the D-door 51 is opened by the time when T2 elapses after the D-door 51 is first unlocked from the unlock standby state, all the doors 51 to 54 are unlocked.
(2) When the D-door 51 is not opened even when T2 elapses after the D-door 51 is first unlocked from the unlock standby state, the other three doors 52 to 54 are kept locked.

Figure 5:
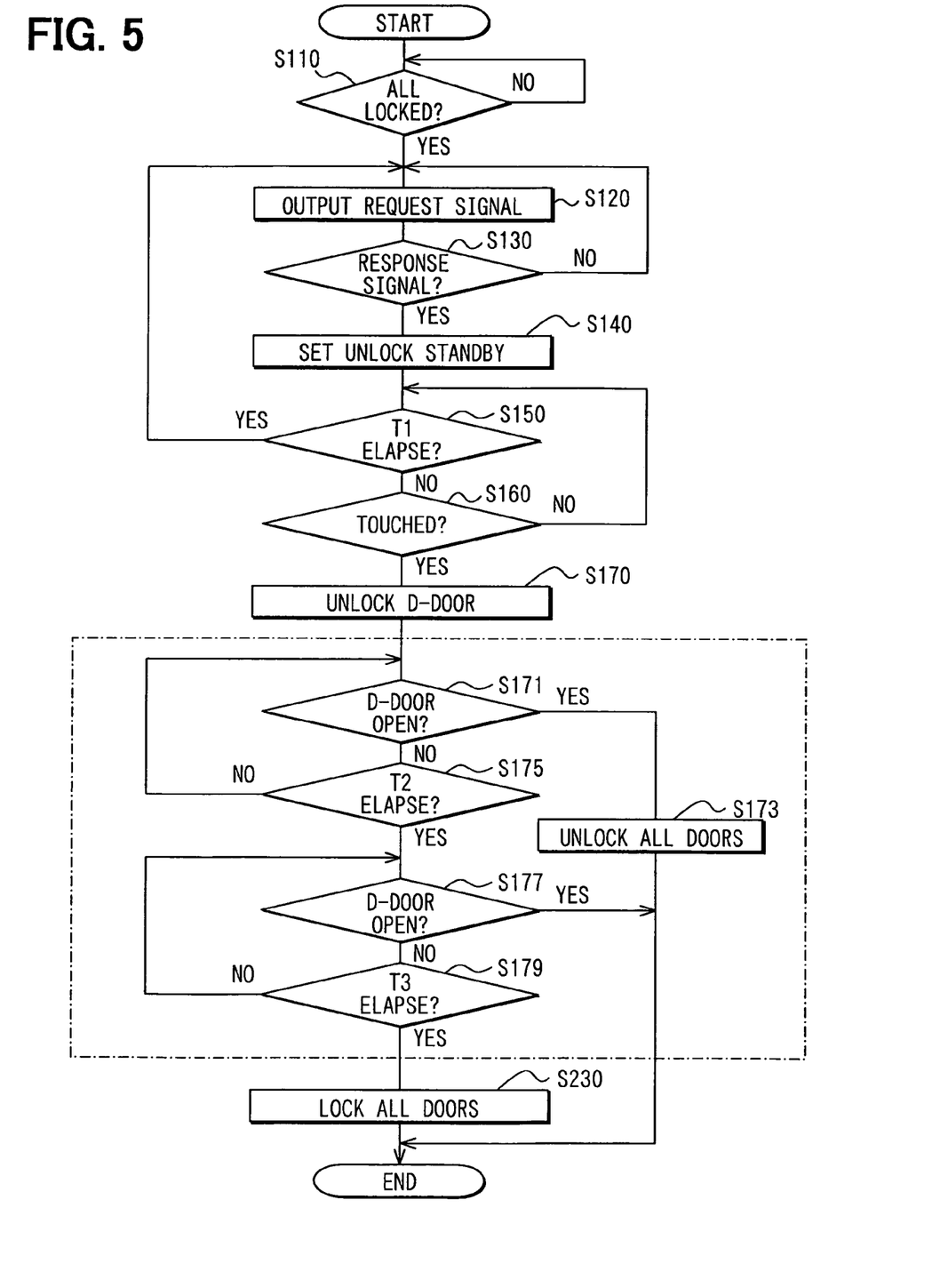
FIG. 5 is a flowchart showing smart door lock control processing of a second embodiment of the present invention.

FIG. 5 shows smart door lock control processing executed by the microcomputer 11 in this embodiment in order to implement the above (1) and (2). In this smart door lock control processing, the processing of each of S110 to S170 and the processing of S230 are the same as the smart door lock control processing of the first embodiment shown in FIG. 4.

The processing of each of S171, S173, S175, S177 and S179 is carried out after the processing of S170. That is, the processing of each of S171 to S179 is carried out in place of the processing of S180 to S220 in FIG. 4.

That is, the unlock standby state is set when the portable unit 10 enters the detection area 41a corresponding to the D-door 51 after the smart door lock control processing of FIG. 5 is started (S140). Furthermore, when the D-door touch sensor 5 is touched and the D-door 51 is unlocked (S170), the processing proceeds to S170 to determine whether the D-door 51 is opened or not. When the D-door 51 is opened by the time when T2 elapses, the processing proceeds from S171 to S1 73, and all the doors 51 to 54 are unlocked to finish this smart door lock control processing.

On the other hand, when the D-door 51 is not opened even when T2 does not elapse, the processing proceeds from S175 to S177 to determine the open/closed state of the D-door 51 again. When the D-door 51 is opened by the time when T3 elapses from the end of S175, the smart door lock control processing is finished. However, when the D-door 51 is not opened even when T3 elapses, the processing proceeds from S179 to S230 to lock all the doors 51 to 54 again.

In this smart entry system, when the D-door touch sensor 5 is touched after the unlock standby state is set, only the D-door 51 is unlocked, and then the other doors are unlocked by opening the D-door 51.

In addition, when T2 elapses after the D-door 51 is unlocked, the other doors 52 to 54 are kept locked even when the D-door 51 is opened. That is, when the user wants not to unlock the other doors 52 to 54 than the D-door 51, the user may wait for the lapse of T2 seconds with no action (without opening the D-door 51) after he/she touches the door handle of the D-door 51 to unlock the D-door 51.

Therefore, the unlocking of the D-door 51 and the unlocking of all the doors 51 to 54 containing the D-door 51 can be distinguished from each other. It is thus possible to surely perform the locking/unlocking operations which matches the user's intention.

Third Embodiment

The third embodiment is also similar to the first embodiment, but different from the first embodiment in the following points. That is, when the D-door touch sensor 5 is touched under the unlock standby state, the operation state of the D-door lock switch 7 is checked. Only the D-door 51 is unlocked when the D-door lock switch 7 is operated or all the doors 51 to 54 are unlocked when the D-door lock switch 7 is not operated.

That is, when the user wants to unlock only the D-door 51, the user may touch the D-door touch sensor 5 while operating the D-door lock switch 7. On the other hand, when the user wants to unlock the doors 51 to 54, the user may merely touch the D-door touch sensor 5.

Figure 6:
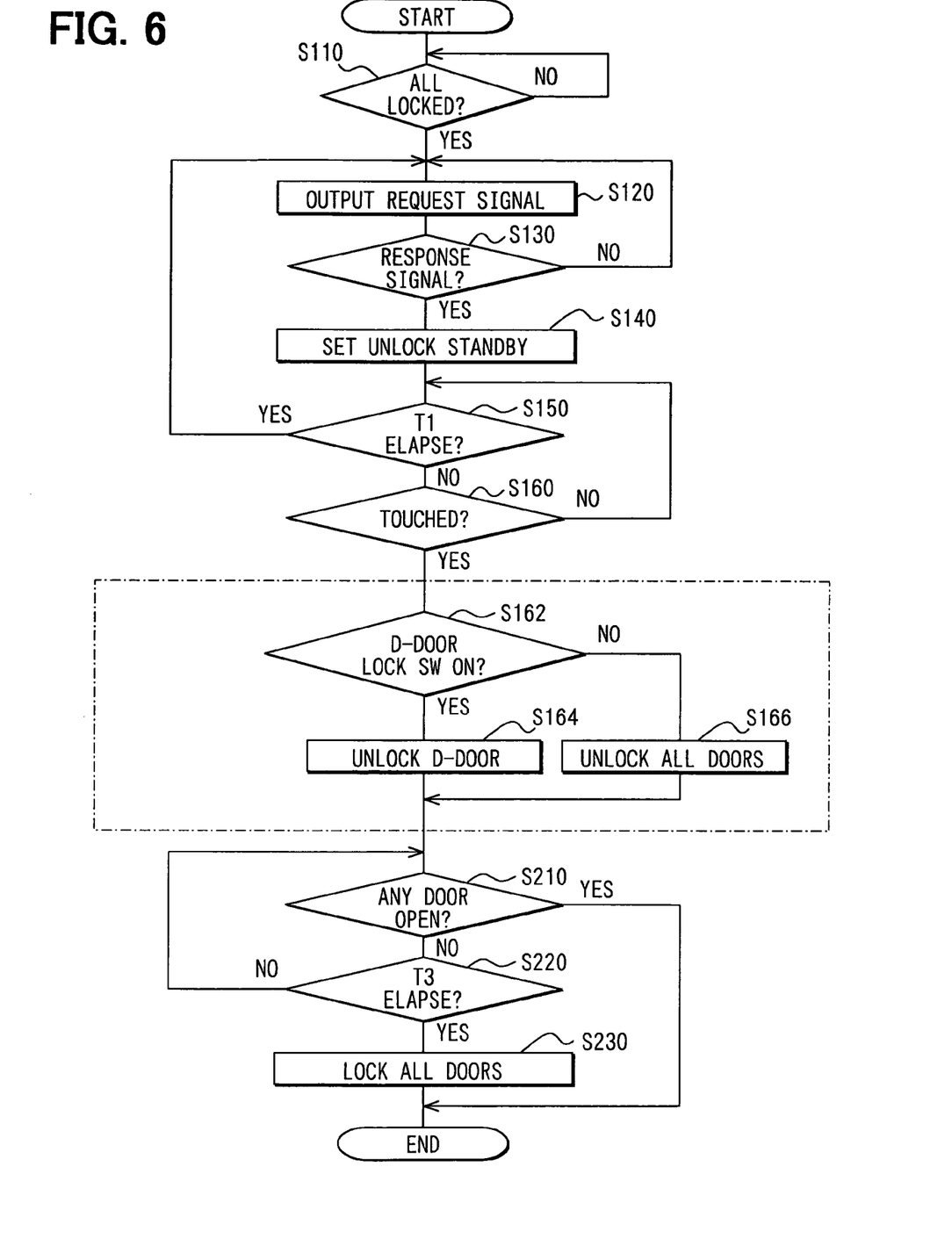
FIG. 6 is a flowchart showing smart door lock control processing of a third embodiment of the present invention.

FIG. 6 shows the smart door lock control processing executed by the microcomputer 11 of this embodiment in order to implement the above operation. As shown in FIG. 6, S110 to S160 are similar to the processing in the first embodiment shown in FIG. 4. The processing of each of S162 to S166 is carried out in place of the processing of S170 to S200 in FIG. 4.

That is, the unlock standby state is set when the portable unit 10 enters the detection area 41*a* corresponding to the D-door 51 after the smart door lock control processing of FIG. 6 is started (S140). When the touch of the user is detected by the D-door touch sensor 5, the processing proceeds from S160 to S162 to determine whether the D-door lock switch 7 is operated (turned on) or not.

When the D-door lock switch 7 is operated, the processing proceeds to S164 to unlock only the D-door 51, and then the processing proceeds to the processing of S210 and subsequent steps. On the other hand, when the D-door lock switch 7 is not pushed, the processing proceeds to S166 to unlock all the doors 51 to 54, and then the processing proceeds to the processing of S210 and the subsequent steps.

According to this smart entry system, the D-door lock switch 7 which is originally provided in lock the door 7 can be also used when the doors are unlocked. Thus the unlocking only the D-door 51 and the unlocking of all the doors 51 to 54 can be instantaneously performed in accordance with the user's intention.

In the smart door lock control processing of FIG. 6, the processing of each of S140 and S160 to S166 corresponds to the processing executed by the control unit of the invention (claim 6).

[Modification]

The above embodiments may be modified in many ways.

For example, in the smart door lock control processing of the first embodiment (FIG. 4), all the doors 51 to 54 are automatically unlocked when T2 elapses while the D-door 51 is not opened after the D-door 51 is unlocked (S200). However, the all the doors 51 to 54 need not be unlocked by the lapse of T2 seconds, but all the doors 51 to 54 may be unlocked when the user or the like touches the D-door touch sensor 5 again after T2 elapses.

That is, this modification aims to implement the twice-operation unlock specification in which only the D-door 51 is unlocked by first touch and then all the doors 51 to 54 are unlocked by second touch. However, unlike the conventional twice-operation unlock specification, the second touch after T2 elapses from the first touch is validated.

Therefore, it is less likely that twice touch is erroneously detected although the user believes that he/she touched only once, so that all the doors 51 to 54 are unlocked again with the user's intention. Therefore, a smart entry system may be constructed based on the twice-operation unlock specification in which only the unlocking of the D-door 51 and the unlocking of all the doors 51 to 54 can be distinguished from each other.

Furthermore, in the smart door lock control processing of the first embodiment (FIG. 4), when the D-door 51 is not opened by the time when T2 elapses after the D-door 51 is unlocked, all the doors 51 to 54 are unlocked at S200. However, in the processing of S200, it is not necessarily required to unlock all the door. For example only the D-door 51 and the P-door 52 may be unlocked. That is, it can be properly determined which of the other doors 52 to 54 than the D-door 51 should be unlocked. Furthermore, the setting may be varied in accordance with user's preference. The same may be applied to the processing of S173 of FIG. 5 and the processing of S166 of FIG. 6.

Furthermore, in the smart entry system of the third embodiment (FIG. 6), when the D-door touch sensor 5 is touched under the state that the D-door lock switch 7 is operated, only the b-door 51 is unlocked. Furthermore, when only the D-door touch sensor 5 is merely touched, all the doors 51 to 54 are unlocked. However, the above switching operation between the unlocking only the D-door and the unlocking of all the doors may be reversed. That is, when the D-door touch sensor 5 is touched while the D-door lock switch 7 is operated, all the doors 51 to 54 may be unlocked. When only the D-door touch sensor 5 is merely touched, the only the D-door 51 may be unlocked.

Still furthermore, in the above embodiments, the D-door 51 is set as the main door, and the unlocking only the D-door 51 and the unlocking of all the doors 51 to 54 are distinguished from each other. However, the present invention may be applied to each of the other doors 52 to 54 than the D-door 51 without limiting to the D-door 51.

What is claimed is:

1. A smart entry system for a vehicle having a plurality of doors comprising:
   a transmitter that is provided in a vehicle in connection with a specified door of the vehicle and transmits a request signal within a predetermined range around the specified door;
   a portable unit for receiving the request signal transmitted from the transmitter and transmitting a response signal in response to the request signal;
   a receiver that is provided in the vehicle and receives the response signal from the portable unit, a touch detecting unit that is provided in the vehicle to detect a touch on the specified door;
   a lock switch that is provided in the vehicle to lock the specified door by an external operation when the specified door is unlocked; and
   a control unit that is provided in the vehicle and sets the specified door to an unlock standby state in response to the response signal, unlocks the specified door if the touch is detected by the touch detecting unit, and locks the specified door if the lock switch is operated under the state that the specified door is in an unlock state,
   the control unit unlocking only the specified door when the specified door is touched in the unlock standby state, and also automatically unlocking at least one of other doors after a predetermined time elapses from the unlocking of the specified door and irrespective of a presence or absence of a touch on at least one of the other doors.

2. The smart entry system according to claim 1, wherein the control unit keeps the other doors locked even after the predetermined time elapses, if the specified door is opened within the predetermined time after the specified door is unlocked from the unlock standby state.

3. The smart entry system according to claim 1, wherein the control unit unlocks at least one of the other doors, when the another door under the unlock standby state is unlocked and then a touch thereon is detected again after the predetermined time elapses.

4. A smart entry system for a vehicle having a plurality of doors comprising:
- a transmitter that is provided in a vehicle in connection with a specified door of the vehicle and transmits a request signal within a predetermined range around the specified door;
- a portable unit for receiving the request signal transmitted from the transmitter and transmitting a response signal in response to the request signal;
- a receiver that is provided in the vehicle and receives the response signal from the portable unit;
- a touch detecting unit that is provided in the vehicle to detect a touch on the specified door;
- a lock switch that is provided in the vehicle to lock the specified door by an external operation when the specified door is unlocked; and
- a control unit that is provided in the vehicle and sets the specified door to an unlock standby state in response to the response signal, unlocks the specified door if the touch is detected by the touch detecting unit, and locks the specified door if the lock switch is operated under the state that the specified door is in an unlock state, the control unit unlocking only the specified door when the specified door is touched in the unlock standby state, and also automatically unlocking at least one of other doors irrespective of a presence or absence of a touch on at least one of the other doors when the specified door is opened after the specified door is unlocked.

5. The smart entry system according to claim 4, wherein the control unit unlocks the at least one of the other doors only when the specified door is opened during a predetermined time from the unlocking of the specified door.

\* \* \* \* \*